United States Patent [19]
Gibson

[11] Patent Number: 5,163,807
[45] Date of Patent: Nov. 17, 1992

[54] APPARATUS FOR TRANSPORTATION OF CARGO STOCK

[76] Inventor: Gary M. Gibson, 3219 La Costa, Missouri City, Tex. 77459

[21] Appl. No.: 247,156

[22] Filed: Sep. 21, 1988

[51] Int. Cl.⁵ .............................................. B60P 1/64
[52] U.S. Cl. ................................ 414/786; 414/500; 414/911
[58] Field of Search ............... 414/500, 559, 341, 345, 414/352, 538, 786, 911; 410/47, 94, 96, 97, 81; 280/79.11

[56] References Cited

U.S. PATENT DOCUMENTS

| | | | |
|---|---|---|---|
| 1,793,966 | 2/1931 | Romine | 410/81 X |
| 2,514,752 | 7/1950 | Faulkner et al. | 414/500 X |
| 3,209,926 | 10/1965 | Mc Williams | 414/341 |
| 3,720,329 | 3/1973 | Gamble | 280/79.11 X |
| 3,734,328 | 5/1973 | Dalglish | 414/911 X |
| 3,788,500 | 1/1974 | Lemelson | 414/500 X |
| 4,008,669 | 2/1977 | Sumrell | 410/47 |
| 4,203,697 | 5/1980 | Cayton | 414/500 X |
| 4,273,485 | 6/1981 | Fischer et al. | 410/97 X |
| 4,695,211 | 9/1987 | Van Iperen et al. | 410/94 X |
| 4,717,298 | 1/1988 | Bott | 410/94 X |
| 4,846,627 | 7/1989 | Stewart | 280/79.11 X |

FOREIGN PATENT DOCUMENTS

| | | | |
|---|---|---|---|
| 390794 | 8/1965 | Switzerland | 410/97 |
| 680928 | 8/1979 | U.S.S.R. | 410/96 |

Primary Examiner—David A. Bucci
Attorney, Agent, or Firm—Browning, Bushman, Anderson & Brookhart

[57] ABSTRACT

An apparatus for transporting cargo comprising an enclosed van having a floor, a platform assembly for positioning on the floor of the van and bearing a load of cargo, the platform assembly being preferably in the form of a dollie which can be easily moved across the floor of the van and a stop which is secured to the floor of the van and engageable with the platform assembly to limit movement of the platform assembly in at least one direction along the floor of the van.

2 Claims, 3 Drawing Sheets

APPARATUS FOR TRANSPORTATION OF CARGO STOCK

BACKGROUND OF THE INVENTION

1. Field of the Invention

The present invention relates to a transportation apparatus and, more particularly, an apparatus for transporting cargo such as rolls of aluminum stock.

2. Description of the Background

Aluminum cans and numerous other products are made from aluminum sheet stock which the aluminum producer provides in rolls resembling rolls of toilet tissue. However, the rolls of aluminum stock are generally approximately sixty inches high, have diameters up to six feet and greater and weigh from 10 to 20 thousand pounds.

In order to transport the rolls of aluminum stock from the aluminum producer to the end user e.g. the aluminum can maker, it is common to transport the rolls by tractor-trailer rigs, so called eighteen-wheelers. Not infrequently, the aluminum producer and the end user are in distinctly different climatic zones. Thus, the aluminum stock may be produced in a climatic zone which is quite cold whereas the end user may be located in a climatic zone which is relatively warm. Thus, it is common for these rolls of aluminum stock to be transported from climatic zones where the temperature is 20° F. to a climatic zone where the temperature is 80° F. It is known that when the rolls of aluminum stock undergo these rather drastic temperature changes during transport, the aluminum is prone to water spotting resulting in discoloration of the stock making it unsuitable for many end uses. Although the phenomena is not totally understood, it is believed that in being transported from a cold climatic zone to a warm climatic zone, the aluminum stock sweats leading to the water spotting and discoloration. This can be quite expensive for the aluminum producer as customarily the producer bears the loss if the aluminum stock arrives at the end user's location in a water spotted condition.

Typically, when the rolls of aluminum stock are transported by tractor-trailer rigs, it is done on a flat bed trailer, the rolls of aluminum stock disposed on pallets, being positioned on the trailer floor at suitable locations and then covered with a tarp so as to insulate the rolls of aluminum stock, to the degree possible, from temperature changes and hence prevent water spotting. It will be readily recognized that the use of tarps to insulate against temperature changes is far from satisfactory particularly when the temperature changes may be quite severe.

While the use of a trailer in the form of an enclosed van in which the temperature could be controlled to prevent the water spotting would be desirable, heretofore it has not been possible to use enclosed vans or trailers for the transport of large rolls of metal stock. As was noted above, the rolls of metal stock can weigh anywhere from 10 to 20 thousand pounds each. For purposes of economy in transporting rolls of metal stock by a tractor-trailer rig, it is generally desirable that the load range from about 40 to about 45 thousand pounds. Typically, in terms of rolls of metal stock this would involve generally three rolls of stock the combined weight of which was in the desired range. In order to ensure stability and handling of the rig during transport, the three rolls are usually positioned such that one roll sits over the front axle of the trailer, a second roll is disposed generally in the middle of the trailer and the third roll is disposed over the rear axle of the trailer.

Because of this weight, in order to load the rolls of metal stock into a van-type trailers, it would be necessary to use a forklift. Thus, a forklift carrying the pallet with the roll of metal stock would enter from the rear end of the van, deposit the roll in the forward end of the van over the front axle, back out of the van and repeat the process with the second and third rolls. However, this is not practical because of the fact that in order to lift a 15 to 20 thousand pound roll of metal stock, it is necessary to employ a forklift which itself weighs approximately 35 thousand pounds. This means that in loading a 20 thousand pound roll of metal stock into a van to be positioned over the front axle, the van would have to bear a total load of 50 thousand pounds. This exceeds the load capacity that a typical van can support between the front and rear axles of the van. While theoretically the undercarriage of the van could be reinforced to support this weight, practically, that cannot be done because of the fact that the added structural support increases the weight of the van to the point where the desired load of 40 to 45 thousand pounds cannot be carried. In this regard it is to be observed that federal law generally prohibits loads of greater than 80 thousand pounds on interstate highways. Thus, although the van could be structurally reinforced to bear the combined weight of the forklift and a 20 thousand pound roll of metal stock, this would mean that the load that could be carried would be less than the 40 to 45 thousand pounds thereby greatly increasing the cost of transportation of the rolls.

SUMMARY OF THE INVENTION

It is therefore an object of the present invention to provide an improved apparatus for transporting cargo which is temperature sensitive.

Another object of the present invention is to provide an apparatus for transporting rolls of metal stock in a controlled temperature environment.

The above and other objects of the present invention will become apparent from the drawing, the description given herein and the appended claims.

The apparatus of the present invention comprises an enclosed van having a floor with a first end and a second end. Generally the van is provided with doors or other such closure means disposed at the rear end, i.e. one of the first or second ends, to permit ingress and egress into and out of the van so that cargo can be loaded and unloaded. Additionally, since the interior of the van can be closed to atmosphere, the van is desirably provided with air conditioning equipment or the like to control the interior temperature and humidity of the van. The apparatus further includes a platform assembly similar to a dolly for positioning on the floor of the van and for bearing a roll of the metal stock. The platform assembly includes means, such as wheels, which are engageable with the floor and which act to decrease the resistance to movement across the floor of the platform assembly. There are further provided stop means secured to the floor of the van and engageable with the platform assembly for limiting movement of the platform assembly in at least one direction along the floor.

DESCRIPTION OF THE PREFERRED EMBODIMENTS

While the present invention will be described with particular reference to an apparatus for transporting rolls of metal stock, particularly rolls of aluminum stock, it is to be understood that it is applicable to the transporting of other types of cargo wherein the cargo may be sensitive to temperature or other weather variations and is comprised of relatively large masses weighing in the 10 to 20 thousand pound class which, because of their nature, must be moved or transported as a single piece.

Figure 1:
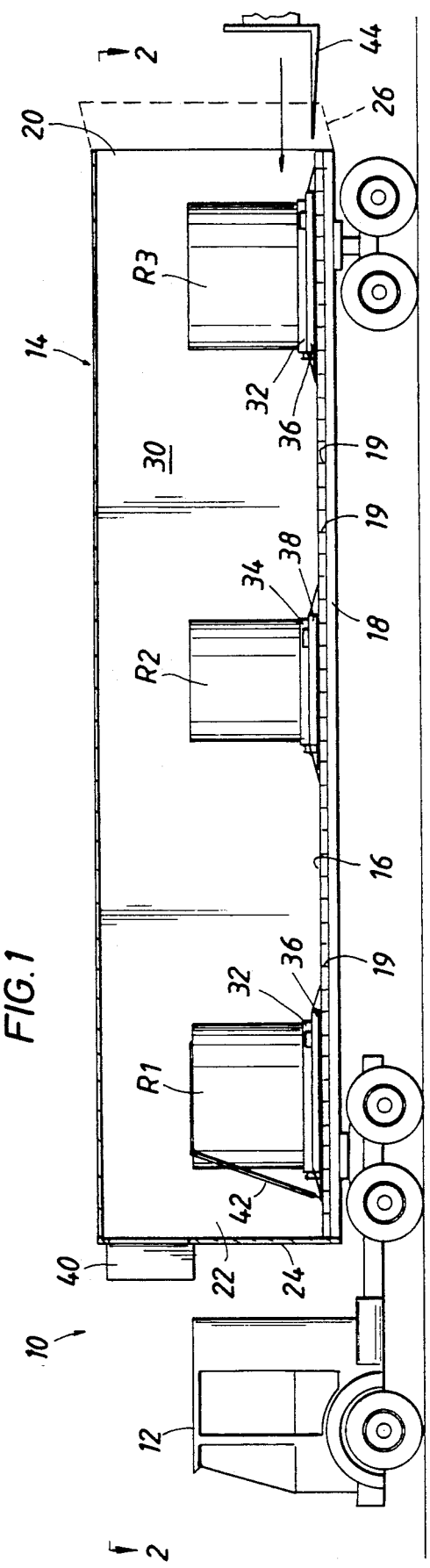
FIG. 1 is an elevational view, partly in section, showing the apparatus of the present invention as utilized in a tractor trailer rig wherein the trailer is in the form of an enclosed van.

Referring now to FIG. 1, there is shown a tractor trailer combination 10 comprising a tractor 12 and a trailer in the form of a van 14. As is well known, the tractor trailer combination 10 is commonly referred to as an eighteen-wheeler, the van or trailer 14 being removably attached to the tractor 12 by means well known to those skilled in the art. The van 14 has a floor 16, generally made of wood, which is supported on beams 18 which, together with cross-beams 19, form a framework for the van 14 on which the floor 16 rests. The van has a first end 20 and a second end 22, the second end 22, in the embodiment shown, being considered the forward end of the van, i.e. the end nearest the tractor 12, and having a fixed wall 24. The first end 20 of the van 14 is generally considered the rear of the van 14 and is usually provided with a suitable closure means such as doors 26, 28 such that the interior 30 of the van can be effectively closed off from the atmosphere and permit selected ingress and egress into and out of the van 14 such that cargo can be loaded and unloaded. Van 14 is also provided with an air conditioning system 40 of the heating/cooling type which can be powered in the well known manner from tractor 12 or independently to control the temperature in the interior 30 of van 14. Since the interior 30 is totally enclosed when the doors 26, 28 are shut, the temperature and humidity in the interior of van 14 can be maintained at a desired, constant level regardless of outside, atmospheric conditions.

Disposed in the interior 30 of the van 14 are rolls $R_1$, $R_2$ and $R_3$ of a metal stock such as aluminum sheeting or the like. As can be seen, rolls $R_1$ and $R_3$ are substantially the same in size whereas roll $R_2$ is somewhat smaller. The rolls $R_1$, $R_2$ and $R_3$ are positioned in van 14 in accordance with usual practices for shipping heavy cargo to ensure maximum handling characteristics of the tractor-trailer rig 10 and thereby ensure safety. The rolls $R_1$, $R_2$ and $R_3$, as is the usual case, rest on pallets 32 and 34 which are generally sized to accommodate the respective size of the rolls. The pallets 32 and 34, in turn, rest on platform assemblies 36 and 38, platform assembly 38 being identical structurally to platform assembly 36 but being slightly smaller to accommodate the relatively smaller size of pallet 34 and roll $R_2$.

Figure 2:
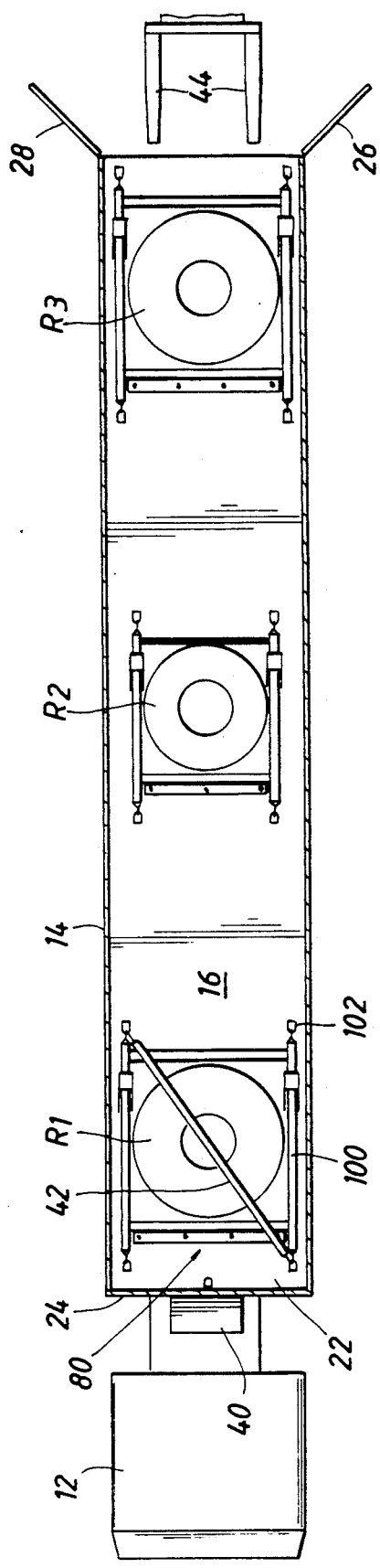
FIG. 2 is a top planar view taken along the lines 2—2 of FIG. 1.

As best seen in FIG. 2, the rolls $R_1$, $R_2$ and $R_3$ are secured against movement relative to pallet 32 and platform 36 by means of straps 42 (shown only with respect to roll $R_1$) which extend across the roll $R_1$ and are secured in a suitable manner, such as by a hook and eye assembly, to the floor 16 of van 14. As will be seen hereafter, platform assemblies 36, 38, once positioned in van 14, are also secured against movement relative to the floor 16 with the result that the rolls $R_1$, $R_2$ and $R_3$, the pallets 32 and 34 and the platform assemblies 36, 38 remain generally fixed in position in the van 14 during transport.

Figure 3:
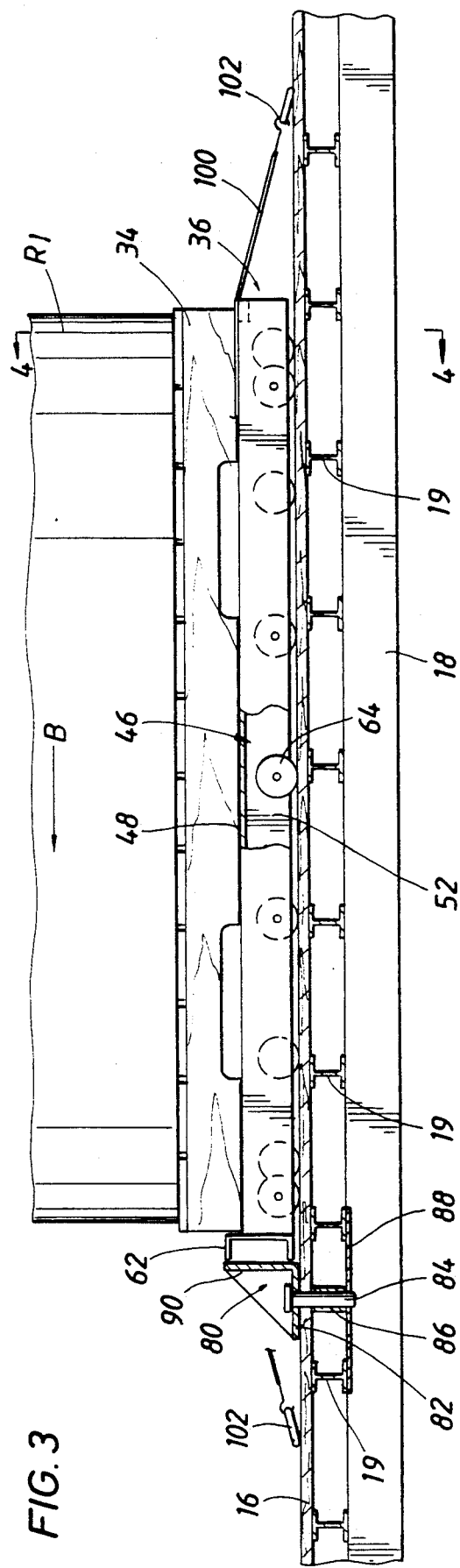
FIG. 3 is a partial elevational view, partly in section, showing the platform assembly and stop means used in the apparatus of the present invention.
Figure 4:
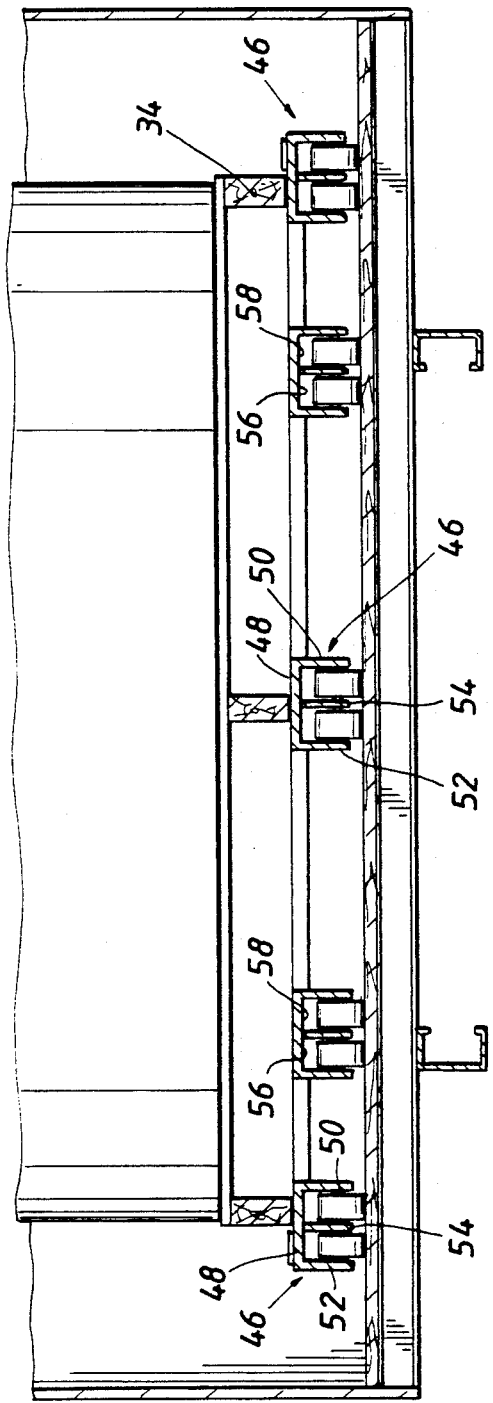
FIG. 4 is a view taken along the lines of 4—4 of FIG. 3.
Figure 5:
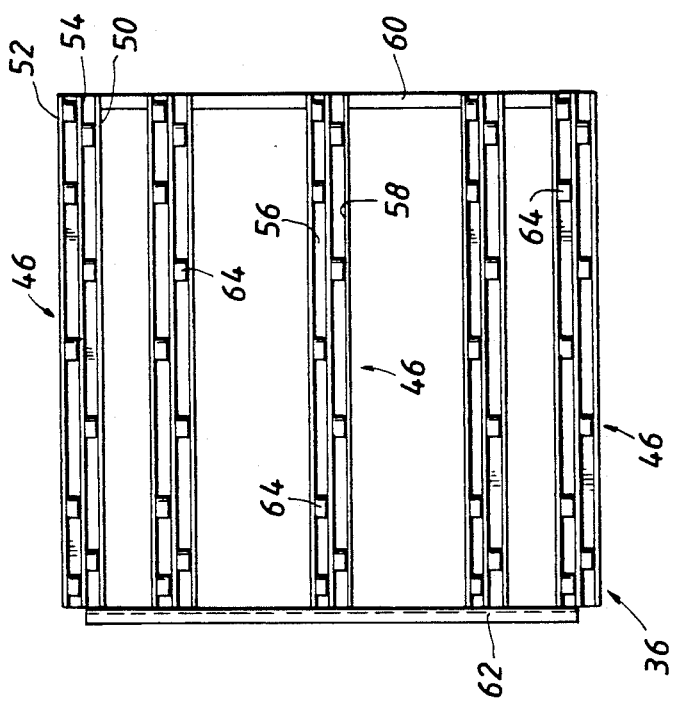
FIG. 5 is a bottom planar view of the platform assembly shown in FIGS. 3 and 4.
Figure 6:
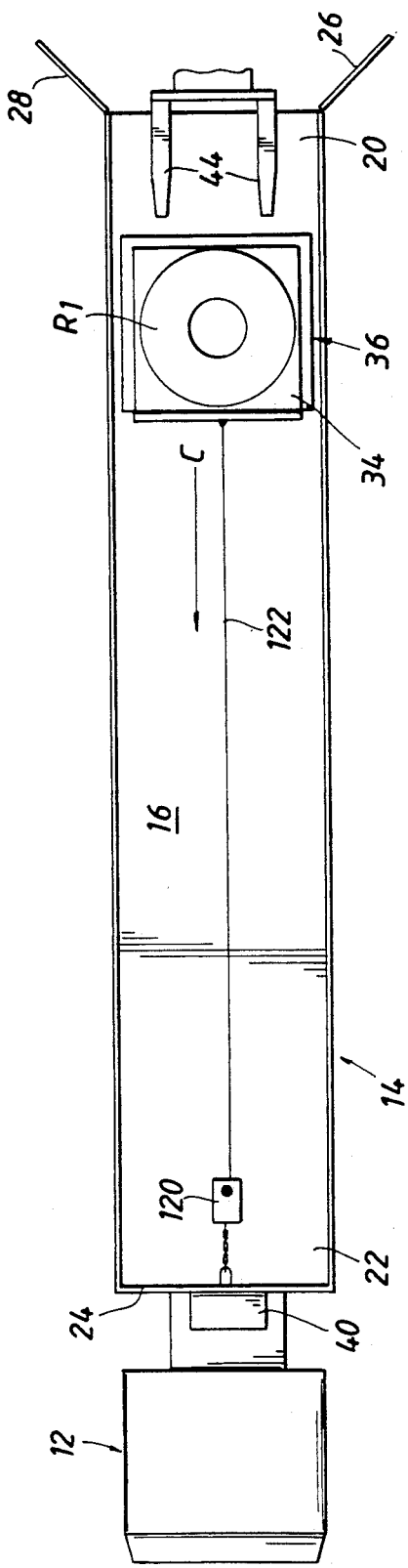
FIG. 6 is a top planar view, similar to FIG. 2, showing one of the rolls of metal stock being loaded into a van.

Referring now to FIGS. 3, 4 and 5, the platform assembly and stop means of the present invention are shown in greater detail. The platform assembly 36 is comprised of a plurality of channel-shaped members 46, each of the channel shaped members 46 having a base plate 48, outer legs 50 and 52 and central leg 54, the legs 50, 52 and 54 depending from base plate 48 and spaced from one another in a generally parallel relationship. Accordingly, each of the channel-shaped members 46 define first and second channels 56 and 58. The platform assembly 36 further comprises a first end member 60 and a second end member 62, end members 60, 62 being secured to and spaced from one another by channel members 46 as shown in FIG. 5, thereby forming a generally rigid grid work or platform on which a pallet or the like can rest. Journaled in the channels 56, 58 are a plurality of wheels 64. The wheels 64, as shown, are generally spaced so as to provide adequate and uniform support to platform assembly 36. As best seen with reference to FIG. 3, the wheels 64 project downwardly out of the channels 56, 58 so as to be engagable with the floor 16 of van 14. It will be appreciated that the wheels 64 provide a means to decrease the resistance to movement of the platform assembly 36 across the floor 16 of the van 14. Other means for accomplishing a decrease in resistance to movement can also be employed.

Referring now particularly to FIGS. 2 and 3, it can be seen that an L-shaped stop member 80 has one leg 82 secured to the floor 16 by means of pins 84 which extend through holes in leg 82, through holes in the floor 16 and are received in a socket member 86 which is supported on the underside of floor 16 by means of a support plate 88 secured to cross beams 19. As best seen with reference to FIG. 2, a plurality of such pins 84 can be employed. Since the pins 84 are removably received in the socket members 86, L-shaped stop member 80 can be removed from the floor 16 simply by pulling the pins 84 out of the socket members 86 which leaves the L-shaped member 80 free. As can be seen with reference to FIG. 3, when the platform assembly 36 is in position on the floor 16 of the van 14, end member 62 of platform assembly 36 engages the second leg 90 of L-shaped member 80. Thus, L-shaped stop member 80 serves as a stop to prevent any movement of the platform assembly 36 in the direction shown by arrow B. Prevention of movement in this direction relative to the floor 16 is important since if the rig 10 were to suddenly stop, there would be a tendency for the platform assembly 36 and its load to shift in the direction of arrow B. It is also possible, although not shown and generally not necessary, to use a similar stop, such as L-shaped member 80, on the opposite end of platform assembly 36. However, in order to restrain any unwanted movement of platform assembly 36 away from stop member 80, it is preferable to provide straps 100 which are strung across platform assembly 36 and which are secured as by hook and eye assemblies 102 to floor 16. It will thus be appreciated that the combination of L-shaped member 80, which serves as a rigid stop with straps 100 and 42 ensures that the entire assembly comprised of platform assemblies 36, 38 and their loads comprised of pallets 32, 34 and rolls $R_1$, $R_2$ and $R_3$ are effectively restrained from any movement relative to floor 16 of van 14.

In utilizing the apparatus of the present invention, the following method could be employed. The roll $R_1$ resting on the pallet 34 could be picked by the forklift tangs 44 and the forklift moved to a position such that the pallet 34 and one of the rolls, e.g. roll $R_1$, can be placed on the platform assembly 36 which has been positioned at the first end 20 of the van 14. The pallet 32 carrying the roll $R_1$ is then lowered onto the platform assembly 36 and the forklift removed. At this point, the platform assembly 36 can be manually rolled from end 20 towards end 33 of the van 14 until it engages the forwardmost stop member 80. However, great labor savings can be accomplished by use of a powered winch assembly 120 which is positioned near the end 22 of van 14 and which is provided with a cable or the like 122 which can be hooked onto the platform assembly 36, the winch assembly 20 then serving to pull the platform assembly 36 and its load in the direction of arrow C, i.e. from end 20 to end 22 of van 14. Once roll $R_1$ has been positioned as shown in FIGS. 1 or 2, roll $R_2$ can then be loaded and positioned in the same manner and likewise for roll $R_3$. Thus, for example, a total load of approximately 45 thousand pounds can be achieved in that roll $R_1$ can be a 20 thousand pound roll, roll $R_2$ can be a 10 thousand pound roll and roll $R_3$ can be a 15 thousand pound roll. This can be accomplished without any structural reinforcement of the underside of van 14 which would greatly increase the weight of the tractor trailer rig and thereby reduce its load carrying capacity on interstate highways.

While the invention has been described above with respect to the use of a tractor trailer rig wherein the trailer comprises an enclosed van, it is apparent that other types of enclosed transportation vans may also be used in the apparatus of the present invention.

The foregoing disclosure and description of the invention is illustrative and explanatory thereof, and various changes in the size, shape and materials, as well as in the details of the illustrated construction may be made within the scope of the appended claims without departing from the spirit of the invention.

What is claimed is:

1. A method for loading an enclosed, temperature and humidity controlled van having a floor with a given load bearing capability, comprising:

loading a plurality of rolls of metal stock, each having a given load, through the use of a fork-lift having a given weight, onto a plurality of platform assemblies, respectively, each of said platform assemblies having means engageable with the van floor for decreasing the resistance of movement across the floor of the van by said loaded platform assemblies; and sequentially moving said platform assemblies across the van floor independently of the fork lift, each such platform assembly during said movements being engaged with the van floor through the said means for decreasing resistance, said method being characterized by the total load of metal stock moved into the van closely approximating the load bearing capability of the van floor independently of the given weight of the fork lift.

2. The method according to claim 1 wherein said plurality of rolls of metal stock comprises three rolls of aluminum.

* * * * *